United States Patent

[11] 3,581,523

| [72] | Inventor | Donald D. Bartholomew |
| | | Utica, Mich. |
| [21] | Appl. No. | 801,539 |
| [22] | Filed | Feb. 24, 1969 |
| [45] | Patented | June 1, 1971 |
| [73] | Assignee | Merit Plastics, Inc. |
| | | East Canton, Ohio |

[54] FLEXIBLE CABLE ASSEMBLY
14 Claims, 3 Drawing Figs.

[52] U.S. Cl. ................................................ 64/2, 74/501
[51] Int. Cl. ..................................................... F16c 1/02
[50] Field of Search .......................................... 64/2, 3; 74/11, 12, 501

[56] References Cited
UNITED STATES PATENTS

| 2,671,325 | 3/1954 | Barnes | 64/2X |
| 2,821,092 | 1/1958 | Cordora | 64/2UX |
| 3,180,625 | 4/1965 | Wyzenbeek | 64/2X |
| 3,230,979 | 1/1966 | Tenreiro | 64/3X |
| 3,242,691 | 3/1966 | Robinson | 64/3 |
| 3,481,156 | 12/1969 | Csipkes | 64/2 |

*Primary Examiner*—Milton Kaufman
*Attorney*—Harness, Dickey & Pierce

ABSTRACT: A flexible cable assembly comprising an elongated torque-transmitting shaft or core member, an elongated housing member defining an internal passage adapted to receive and rotatably support the core member, and a liner member interposed between the exterior of the core member and the interior of the housing member, the liner member comprising an annular support section and a plurality of longitudinally extending, circumferentially spaced, radially projecting ribs which are of a relatively deformable and resilient construction and adapted to resist radial movement of the core member toward the housing member upon rotation thereof.

PATENTED JUN 1 1971
3,581,523
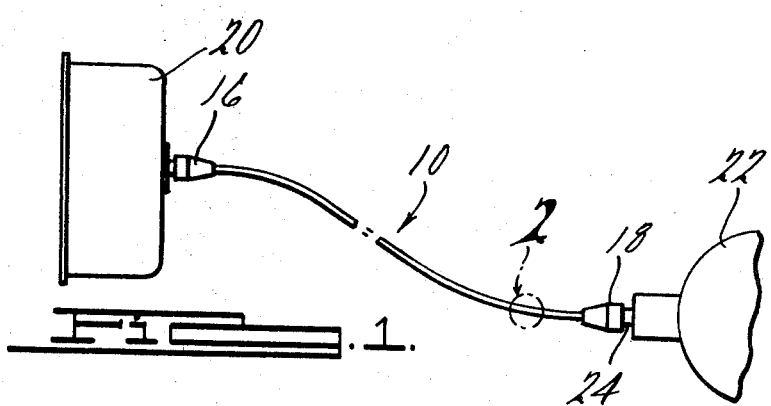
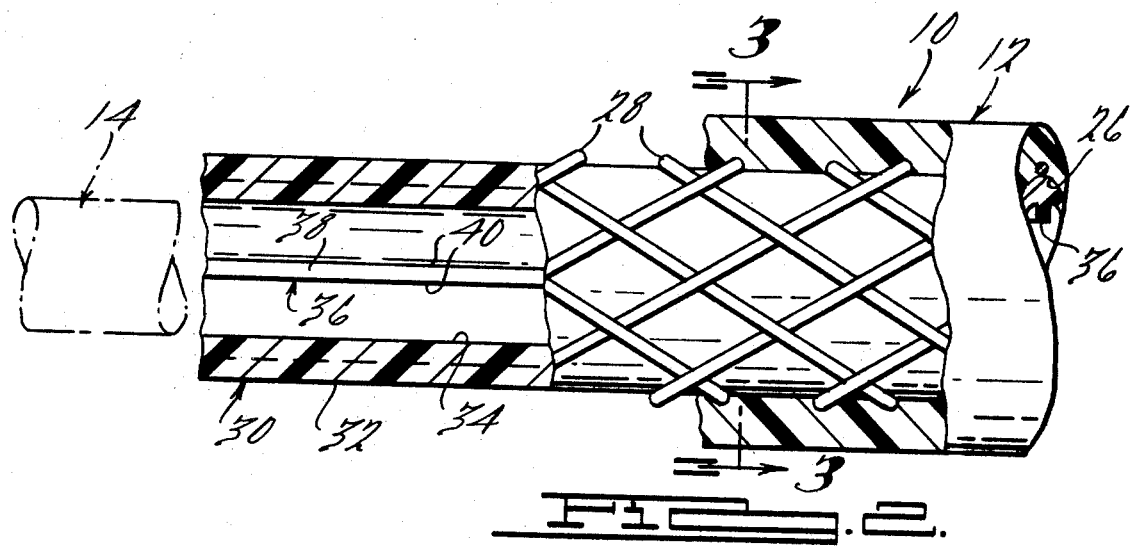
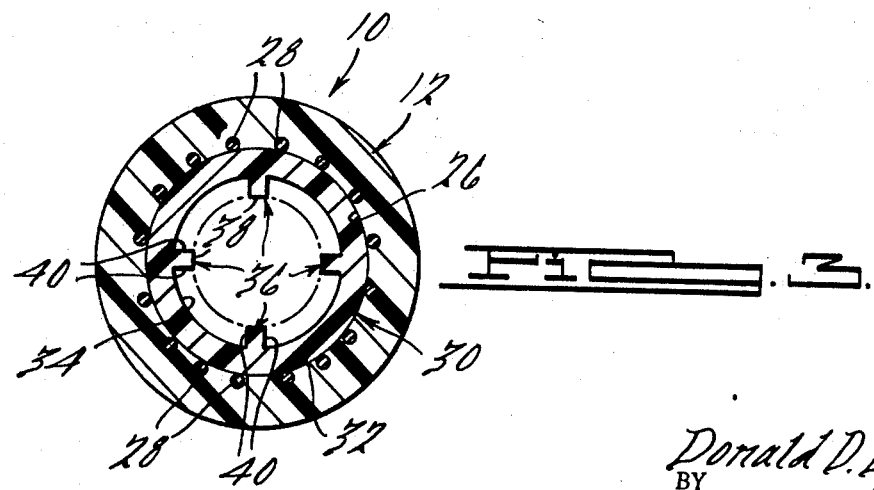
INVENTOR.
Donald D. Bartholomew.
BY
Harness, Dickey & Pierce
ATTORNEYS.

FLEXIBLE CABLE ASSEMBLY

BACKGROUND OF THE INVENTION

Flexible drive cables have been used in a variety of applications where it is desirable to transmit rotary motion or torque to a location remote from the source of the rotary motion, for example, in speedometers, tachometers and the like, and it is common to find flexible drive assemblies in which rotational speeds in excess of 1,000 r.p.m. are experienced. Such flexible drive cables usually employ some type of flexible tubular housing to guide and constrain an internally mounted rotatable shaft or core, which may, for example, be fabricated from a series of small-diameter wires closely wrapped about a central mandrel wire. In this type of core construction, successive layers or wraps of wire are usually wrapped in opposite helical directions to achieve smooth operation of the assembly around bends or arcuate sections thereof and to provide a design capable of transmitting torque to either direction of rotation.

The mechanical construction of the aforesaid type of multiwire flexible cores requires that there be some relative motion between the successive layers of wire when the rotating core assumes a relatively arcuate configuration. This arises due to the differences in bend radii between the surface of the core nearest the center of the bend and the surface of the core at positions further away from the center of the bend, resulting in a slight amount of movement of the wires of a given layer or wrap with respect to the wires of adjacent layers or wraps. Such relative motion between layers is resisted by the natural resiliency of the wires, as well as by the "scrubbing" friction between the wires of successive layers. In practice, a compromise is made between the tightness of the wraps (friction between layers) and the resilient character of the wire, with the resulting core usually exhibiting some nonuniformity in the amount of torque (differential torque) required to turn the core through various portions of a complete revolution. In operation, this differential torque causes an uneven output at the driven end of the core when compared to the input at the driving end thereof, and along the length of the core, between the driving and driven ends thereof, forces are generated which cause the core to move off the longitudinal axis of the drive assembly. These forces have been found to create severe oscillation of the core intermediate of the ends thereof, which oscillations cause the core to indiscriminately "slap," "bang" or otherwise impinge against the sidewalls of the housing. The noise thus produced is extremely undesirable and much time and expense has been devoted to minimize or reduce the same to more acceptable levels.

Among the many efforts heretofore made to reduce the aforesaid noise, it has been considered to pack the space between the interior of the housing member and the exterior of the core member with a relatively high viscosity lubricant; however, this practice has been objectionable from the standpoint that lubricant seals, packings or the like are required to prevent the lubricant from leaking from the assembly. Moreover, it has been difficult to maintain a relatively uniform distribution of lubricant along the entire length of the cable assembly in spite of the provision in various flexible drive assemblies heretofore known and used of a series of longitudinally spaced pockets, flutes or rifling for retaining the lubricant evenly distributed along the assembly.

Generally speaking, the present invention is directed toward a new and improved flexible cable assembly which is designed to overcome the shortcomings of similar heretofore known and used devices, more particularly, the present invention provides a construction which minimizes to the extreme any undesirable noise that has heretofore been produced upon indiscriminate impinging or engagement of a rotating core member against the interior side of the associated flexible drive assembly housing. Specifically, the present invention is directed toward a new and improved flexible drive shaft assembly in which a plurality of radially extending resilient deformable ribs are provided interjacent the outer periphery of the core member and the inner periphery of the housing member, which ribs are designed to deform slightly upon engagement of the rotating core member therewith. Deformation of the ribs functions to absorb kinetic energy of the rotating core member which is the inherent cause of the "slapping" or "banging" of the rotating core. Although the ribs may be of various configurations, they preferably extend longitudinally of the assembly at circumferentially spaced locations. The ribs are supported interiorly of the assembly by means of an annular support section which may be coextensive of the entire assembly and peripherally engaged with the interior of the housing member, the ribs being formed integrally thereof and extending radially inwardly into close proximate relation with the outer periphery of the rotatable core member. In operation, at such time as the rotating core member moves off the longitudinal axis of the assembly along some segment of its length, such movement is constrained by the adjacent ribs or combination of ribs, and the energy of impact of the core with the ribs causes the same to deform somewhat, thereby absorbing the energy in the localized area of the core member having a tendency to impinge against the sidewall of the housing member. Even though there may be many of such off axis "excursions" of the rotating core member in all radial directions relative to the axis of the assembly, each area of excursion will be effectively met and limited by the ribs.

SUMMARY OF THE INVENTION

This invention relates generally to flexible cable assemblies and, more particularly, to a new and improved flexible cable assembly which exhibits a minimum amount of noise upon operation thereof.

It is accordingly a general object of the present invention to provide a new and improved flexible drive cable assembly.

It is a more particular object of the present invention to provide a new and improved flexible drive cable assembly having means interposed between the outer periphery of a rotatable core member and the inner periphery of an exterior housing member which functions to absorb the energy of the core member produced upon off axis rotation thereof.

It is another object of the present invention to provide a new and improved flexible drive cable assembly of the above character which utilizes a plurality of generally resilient deformable rib members interjacent the outer periphery of a rotatable core member and the inner periphery of an exterior housing member for absorbing the aforesaid energy.

It is still another object of the present invention to provide a new and improved flexible drive cable assembly of the above-described type wherein the rib members extend longitudinally of the assembly and are circumferentially spaced around the outer periphery of the core member, with the rib members being operatively supported within the exterior housing member by an annular support section peripherally engaged with the interior of the housing member.

It is another object of the present invention to provide a new and improved flexible drive cable assembly which is of an extremely simple design, is economical to manufacture and relatively easy to assemble.

Other objects and advantages of the present invention will become apparent from the following detailed description taken in conjunction with the accompanying drawing.

BRIEF DESCRIPTION OF THE DRAWING

FIG. 1 is a side elevational view of the flexible drive cable assembly of the present invention, as shown in operative association with a driving mechanism adapted to impart rotary motion to the core member thereof and a driven mechanism actuable in response to such rotary motion of the core member;

FIG. 2 is an enlarged fragmentary cross-sectional view, partially broken away, of the flexible drive cable assembly of the present invention; and FIG. 3 is a transverse cross-sectional view taken substantially along the line 3—3 of FIG. 2.

DETAILED DESCRIPTION OF A PREFERRED EMBODIMENT

Referring now to the drawing, a flexible cable assembly 10, in accordance with a preferred embodiment of the present invention, is shown as generally comprising an external or exterior housing member 12 adapted to rotatably support an elongated power- or torque-transmitting shaft or core member 14. In practice, the core member 14 may be provided with fitting or coupling means 16, 18 on the ends there of for operative connection at one end thereof to a driven member or mechanism, such as a tachometer, speedometer or the like, representatively designated by the numeral 20, and at the opposite end thereof to a driving member or mechanism 22 of any suitable construction having a suitable rotatable drive or output shaft 24.

Referring now in detail to the construction of the external housing member 12, said member is preferably of a strong, relatively rigid, but bendable or flexible construction and is fabricated of a synthetic plastic material, such as polypropylene or a similar material, either natural or synthetic, which is resistant to deterioration and readily adapted for conventional molding or extruding techniques. The member 12 is substantially coextensive of the assembly 10 and is generally circular in transverse cross section and defines a central longitudinally extending bore or passage 26 that extends the entire length of the member 12. The sidewall or thickness of the housing member 12 is preferably of uniform cross section and may be reinforced or strengthened by the provision of helically arranged or wound reinforcing members or wires, generally designated 28, which may be, if desired, wound around the outside of the member 12 but are preferably embedded therein at a position circumjacent the passage 26. The reinforcing wire 28 may be either in the form of a braided or woven annular shroud or be provided by successively applied helical wraps of wire, with one wrap being wound in one direction and another wrap being wound in the opposite direction. The number of successive wraps or wire density in a given woven or braided shroud will, of course, depend upon the strength required of the housing member 12 and the particular application to which the flexible shaft assembly 10 is to be applied. By way of example, in a typical commercial embodiment of the cable assembly 10, wherein the housing member 12 is approximately 0.348 inches in diameter O.D., the reinforcing wires 28 may be in the order of 0.013-inch-diameter high-carbon steel and arranged longitudinally of the member 12 in a density of approximately 4—7 helical convolutions per inch.

The internal shaft or core member 14 of the assembly 10 may be of any suitable relatively flexible construction adapted to efficiently transmit rotary motion or torque between the driven and driving ends of the assembly 10. Although not shown particularly herein, where the assembly 10 is to find application wherein high rotational speeds are to be experienced, the core member 14 is preferably fabricated of a series of small-diameter wires closely wrapped about a central mandrel wire extending longitudinally of the core member 14. As is conventional in the art, such multiwire core members usually consist of successive wire wraps arranged or wound in a generally helical configuration, with each layer or wrap being wound in the opposite direction with respect to its adjacent wraps, in order to achieve smooth operation around arcuate sections of the assembly 10 and to provide a design capable of transmitting torque in either direction of rotation. It will be apparent, of course, that the core member 14 may be of various other well-known constructions and may comprise only a single length of relatively flexible material or a multiplicity of smaller diameter wires or members wound or otherwise disposed in a wide variety of configurations. Of course, in the event the core member 14 is to function in transmitting forces longitudinally of the assembly 10, as is the case of push-pull cable assemblies, the member 14 should be capable of carrying appropriate loads under tension and/or compression, as will be apparent.

In accordance with the principles of the present invention, interposed between the outer periphery of the core member 14 and the periphery of the passage 26 is a new and improved means for absorbing off axis kinetic energy of the core member 14 produced upon rotation thereof. More particularly, the new and improved means of the present invention is provided in the form of an elongated liner assembly, generally designated 30, which is disposed between the outer surface of the core member 14 and the periphery of the passage 26, as best see in FIG. 3. The liner assembly 30 generally comprises an elongated hollow cylindrical or tubular support section 32 that is dimensioned such that the outer periphery thereof is contiguously engaged with the inner surface of the housing member 12. The inner periphery of the support section 32 defines an annular surface 34 which is spaced radially outwardly from the core member 14 and is formed with a plurality of radially inwardly extending fins or rib members, generally designated by the numeral 36. The rib members 36 are integrally formed on the support section 32 and are preferably equally circumferentially spaced around the core member 14, with the members 36 preferably extending along the entire length of the assembly 10. The number of rib members 36 may be varied somewhat in accordance with the size (cross-sectional area) of the assembly 10, but in a typical operational embodiment thereof, four of such rib members 36 are provided in the assembly 10 and are spaced 90° apart around the periphery of the core member 14.

Each of the rib members 36 defines a longitudinally extending circumferentially disposed end or interior surface 38 that is disposed in close proximate relation with the outer periphery of the core member 14, and with a pair of spaced substantially parallel sidewalls or surfaces 40 that extend longitudinally of the assembly 10, as best seen in FIGS. 2 and 3. The rib members 36 are of a resilient deformable construction and are thus adapted to deform upon engagement therewith of the rotatable core member 14, which deformation of the members 36 functions to absorb energy in certain localized areas along the assembly 10 and thereby prevent the core member 14 from slapping, banging or otherwise impinging against the interior of the housing member 12, as will be described.

The rib members 36, and hence the entire assembly 30, may be fabricated of various materials which render the members 36 resilient and deformable so that they will function in the manner above described. One preferable material that has been found to be satisfactory in the fabrication of the assembly 30 is sold and distributed under the trademark Zytel 91 which is a moldable or otherwise suitably formed nylon resin material. It will be apparent, of course, to a skilled artisan that other materials well known in the art may be used in the fabrication of the assembly 30, such as various other types of nylon, Delrin or the like.

Although the rib members 36 are illustrated and described herein as extending along the entire length of the assembly 10, said members 36 alternatively may comprise a series of relatively short or segmental sections extending either longitudinally, i.e., parallel, to the axis of the assembly 10, or instead, transversely or perpendicular to the length of the assembly 10, with the spacing between such longitudinally spaced rib segments being such that said segments will effectively absorb the off axis energy of the core member 14 during rotation thereof in the same effective manner as is achieved with the longitudinally extending rib members 36 described herein.

In operation, the core member 14 is adapted to rotate relative to the housing member 12 and liner assembly 30 such as, for example, upon actuation of the mechanism 22, whereby to transmit rotational power or torque from the mechanism 22 to the mechanism 20. In the event the rotating core member 14 tends to move away from the longitudinal axis of the assembly 10 at some position along the length thereof, such movement is constrained or resisted by one or more of the rib members 36. At such time as the periphery of the core 14 engages or impinges against the interior surface 38 of the rib members 36, the members 36 will deform slightly due to their resilient deformable character, thereby absorbing the off axis energy in the particular localized area or segment along the assembly 10. It has been observed that such off axis energy of the core member 14 is removed at a rate sufficient to prevent a buildup or storage thereof so as to prevent any wild or severe oscillation of the core member 14 within the housing member 12. Accordingly, the rib members 36 function to preclude any slapping, banging or similar type impingement of the core member 14 against the interior of the housing member 12, thereby effectively minimizing to the extreme any noise produced during operation of the assembly 10.

It will be noted that although particular reference has been made herein to the liner assembly 30, and in particular to the rib members 36 thereof, absorbing the off axis energy of the core member 14 produced upon rotation thereof, the present invention, in the broadest sense thereof, is not intended to be limited to a flexible cable assembly wherein the core member thereof is strictly of a rotatable character, since it is contemplated that the rib members 36 or the like will function to effectively absorb off axis energy produced when the associated core member moves longitudinally, as well as or in lieu of rotatably, as would occur in a push-pull cable assembly. Accordingly, the present invention will find universality of application in virtually all types of flexible cable assemblies, either of the rotatable type or push-pull type.

While it will be apparent that the preferred embodiment illustrated herein is well calculated to fulfill the objects above stated, it will be appreciated that the present invention is susceptible to modification, variation and change without departing from the proper scope or fair meaning of the subjoined claims.

I claim:

1. In a flexible cable assembly,
an elongated torque-transmitting core member,
an elongated housing member defining an internal passage adapted to receive and movably support said core member, and
means disposed between the exterior of said core member and the interior of said housing member including at least one resilient deformable rib means adapted to resist radial movement between said members.

2. An assembly as set forth in claim 1 wherein said rib means extends radially between said core member and said housing member.

3. An assembly as set forth in claim 2 wherein said rib members are circumferentially spaced around said core member.

4. An assembly as set forth in claim 3 which includes four rib members spaced 90° apart around the outer periphery of said core member.

5. An assembly as set forth in claim 4 wherein said rib members are integrally formed around the inner periphery of said hollow support member.

6. An assembly as set forth in claim 1 which includes a plurality of radially disposed and axially extending rib members and support means for supporting said rib members at circumferentially spaced positions around said core member.

7. An assembly as set forth in claim 6 wherein said support means comprises an elongated hollow member disposed between the outer periphery of said core member and the inner periphery of said passage.

8. An assembly as set forth in claim wherein said housing member is fabricated of a synthetic plastic material and includes reinforcing means for strengthening said housing member.

9. An assembly as set forth in claim 8 wherein said reinforcing means comprises wire means embedded within said synthetic plastic material.

10. An assembly as set forth in claim 1 wherein said rib means is fabricated of a synthetic plastic material.

11. In combination in a flexible cable assembly,
an elongated force-transmitting core member,
an elongated enclosure member at least partially surrounding said core member, and
means interposed between the confronting surfaces of said core member and said enclosure member adapted to deform in order to absorb kinetic energy of one of the members upon movement thereof relative to the other of said members.

12. The combination as set forth in claim 11 wherein said means for absorbing kinetic energy comprises a deformable rib member extending between the outer periphery of said core member and the inner periphery of said enclosure member.

13. The method of absorbing kinetic energy of lateral movement of an elongated force transmitting core member which is movably disposed within an elongated housing member, the steps which include,
providing a relatively deformable medium between the outer periphery of the core member and the inner periphery of the housing member, and
deforming said medium upon relative movement of said core member with respect to said housing member.

14. The method as set forth in claim 13 which includes the step of providing a radially deformable rib member interjacent the outer periphery of the core member and the inner periphery of the housing member and radially deforming said rib member in response to rotation of one of said members with respect to the other of said members.